United States Patent [19]
Schroeter

[11] 3,709,944
[45] Jan. 9, 1973

[54] METHOD OF PREPARING 3-HYDROXY ALDEHYDES AND KETONES

[75] Inventor: Siegfried H. Schroeter, Schenectady, N.Y.

[73] Assignee: General Electric Company, Schenectady, N.Y.

[22] Filed: April 1, 1970

[21] Appl. No.: 24,832

Related U.S. Application Data

[63] Continuation-in-part of Ser. No. 732,853, May 29, 1968, Pat. No. 3,522,317.

[52] U.S. Cl. ................. 260/598, 260/602, 260/594, 260/592, 260/586 A, 260/586 R
[51] Int. Cl. .............................................. C07c 45/00
[58] Field of Search ......... 260/602, 594, 592, 586 A, 260/586 R, 598

[56] References Cited

UNITED STATES PATENTS

| | | | |
|---|---|---|---|
| 3,284,509 | 11/1966 | Davis | 260/602 |
| 2,564,649 | 8/1951 | Rogers | 260/602 X |
| 2,694,077 | 11/1954 | Stansbury et al. | 260/602 X |
| 2,879,278 | 3/1959 | Kaas | 260/602 X |

Primary Examiner—Bernard Helfin
Attorney—Richard R. Brainard, Paul A. Frank, Joseph T. Cohen, Charles T. Watts, William A. Teoli, Frank L. Neuhauser, Oscar B. Waddell and Joseph B. Forman

[57] ABSTRACT

3-Hydroxy-substituted carbonyl compounds are produced by the reaction of 2-hydrocarbonoxyoxetanes with water. Hydrocarbonoxyoxetane mixtures such as mixtures consisting essentially of 2-alkoxyoxetanes and 3-alkoxyoxetanes which can be made by the ultraviolet light-induced reaction of an aldehyde or ketone with a vinyl ether also can be employed as the 2-hydrocarbonoxyoxetane. The 3-hydroxy-substituted carbonyl compounds made by the aforesaid method can be employed as plasticizers for polyvinylchloride resins, cosolvents for aqueous polyvinyl alcohol, or maleic anhydride vinyl ether copolymer mixtures, etc. The 3-hydroxy-substituted carbonyl compounds also are intermediates for making α,β-unsaturated aldehydes and ketones which include useful intermediates for making vitamin A and polymers.

4 Claims, No Drawings

METHOD OF PREPARING 3-HYDROXY ALDEHYDES AND KETONES

This application is a continuation-in-part of copending application Ser. No. 732,853, filed May 29, 1968 and now U.S. Pat. No. 3,522,317, assigned to the same assignee as the present invention.

This invention is concerned with a process for producing 3-hydroxy aliphatic aldehydes and ketones by the hydrolysis of 2-hydrocarbonoxyoxetanes.

Prior to the present invention, it was known that β-hydroxycarbonyl compounds, such as 3-hydroxy aliphatic aldehydes and ketones were convertible to intermediates useful for making vitamin A and polymers. For example, 3-methyl-3-hydroxy-butanal can be converted to 3-methyl-2-butene-1al, a vitamin A intermediate. It also was known that these 3-hydroxy aliphatic aldehydes and ketones were useful as solvents and plasticizers for organic resins to provide valuable polymeric films suitable for fabric coverings and useful in furniture manufacture.

One method for making such β-hydroxycarbonyl compounds is by aldol condensation of an aldehyde or ketone with another aldehyde or ketone having one or more protons at the carbon atom alpha to the carbonyl group. This technique in many instances is unsatisfactory because of self-condensation of the more reactive carbonyl compounds. Metalated Schiff bases of the aldehyde and ketone also can be employed but this method is uneconomical and not suited to commercial practice. Other special techniques are available to produce particular β-hydroxy carbonyl compounds using formaldehyde and carbonyl compounds having a tertiary hydrogen alpha to carbonyl group.

The present invention is based on the discovery that a general method for making β-hydroxy carbonyl compounds of the formulas,

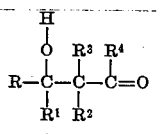
(1)

and

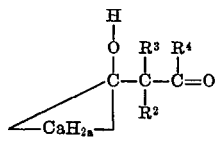
(2)

is provided by mixing 2-hydrocarbonoxyoxetanes, shown by formulas (3) and (4) below, with water and the mixture maintained at a temperature of from O°C to 150° C, where R is a member of the class consisting of alkyl groups containing from one to 10 carbon atoms and aryl groups containing up to 12 carbon atoms, $R^1$, $R^2$, $R^3$, and $R^4$ are hydrogen or an R group, and "a" is an integer of from 3 to 18, inclusive.

The 2-hydrocarbonoxyoxetanes used in the practice of the invention are included by the formulas,

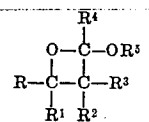
(3)

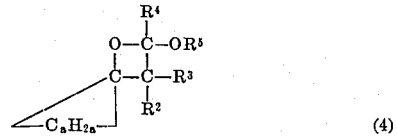
(4)

where R, $R^1$, $R^2$, $R^3$, etc. are as previously defined and $R^5$ is selected from R radicals. These 2-hydrocarbonoxyoxetanes and a method for making them are described in my copending application Ser. No. 671,576, filed Sept. 29, 1967 and now abandoned, and assigned to the same assignee as the present invention. There is described in Ser. No. 671,576 a method for making 2-hydrocarbony-oxetanes of formulas (3) and (4) by effecting addition between a vinyl ether of the formula,

(5)

and a carbonyl compound of the formula,

(6)

or a cycloaliphatic carbonyl compound of the formula, $$C_aH_{2a-2} = O,  \quad (7)$$

by irradiation with ultraviolet light at from 2000 to 3700 Angstroms, where R, $R^1$, $R^2$, $R^3$, $R^4$, $R^5$ and "a" are as previously defined.

In the practice of the invention, the 2-alkoxy oxetane can be converted to the 3-hydroxy carbonyl compound at temperatures of from about 0° C to 150° C or higher. Inasmuch as the reaction rate is slower at the lower temperatures, it is preferred to employ temperatures in the range of from 20° C to 80° C. The presence of acids or proton sources can greatly accelerate the reaction rate leading to possible undesired side reactions such as hydrolysis of 3-alkoxy oxetane which can be present in the mixture.

The ratio of water to the alkoxy oxetanes of formulas (3) and (4) employed in the process of this invention is not narrowly critical, and as little as 1 to as many as 100 moles or more of water per mole of alkoxyoxetane can be employed. It is preferred to employ the water in at least a two-to-one molar ratio in order to insure completeness of re-action and ease of recovery of the reaction products.

A solvent is not necessary in conducting the process of this invention. A solvent can be employed, however, if desired. Solvents other than the reactants which are useful in conducting the process of this invention are those liquids in which the reactants and the reaction products are soluble and which do not contain groups which would react with the oxetane to give by-products during the course of the reaction. Such solvents will vary with the nature of the oxetane employed and are, for example, pentane, hexane, benzene, diethylether, dibutylether, tetrahydrofuran, N,N-dimethyl-formamide, N,N-dimethylacetamide, etc. The amount of solvent employed in the process of this invention can vary, by weight, from 10 to 1000 parts of the solvent, per 100 parts of the reactants.

The process of the present invention can be conducted at subatmospheric, atmospheric or superatmospheric pressures. It is preferred, for simplicity and ease of operation, to conduct the process at atmospheric pressure and in the liquid phase.

The monovalent hydrocarbon radicals which $R^1$, $R^2$, $R^3$, $R^4$, and $R^5$ can represent include alkyl radicals such as methyl, ethyl, isopropyl, tertiary butyl, octyl, etc.; alkenyl radicals such as vinyl, crotyl, allyl, methallyl, decenyl, etc.; cycloalkyl radicals such as cyclopentyl, cyclohexyl, etc.; cycloalkenyl radicals such as cyclopentenyl, cyclo- hexenyl, cycloheptenyl, etc.; aryl radicals such as phenyl, xenyl, naphthyl, etc.; arylalkyl radicals such as benzyl, phenylethyl, phenylpropyl, etc.; alkaryl radicals such as tolyl, xylyl, etc. and the halogen derivatives thereof which include chloromethyl, γ-chloropropyl, bromocyclohexyl, perfluorovinyl, chlorocyclohexyl, trifluoropropyl, pentafluorobutyl, dibromophenyl, pentachlorophenyl, etc.

Illustrative of the oxetanes which can be employed in the process of this invention are, for example, 4,4-dimethyl-2-methoxyoxetane; 4,4-(p-bromo)diphenyl-2-n-butoxyoxetane; 4-methyl-4-ethyl-2-propoxyoxetane; 4,4-diethyl-3,3-dimethyl-2-n-butoxyoxetane; 3,4-dimethyl-2-methoxyoxetane; 3,4-diphenyl-2-methoxyoxetane; 4,4-dimethyl-2-isobutoxyoxetane; 3-ethyl-4-phenyl-2-n-butoxyoxetane; 4-phenyl-3-methyl-2-ethoxyoxetane; 4-(p-bromo)phenyl-3-methyl-2-ethoxyoxetane; 2-methoxy-1-oxaspiro[3.5]nonane; 3-(p-chloro)phenyl-2-ethoxy-1-oxaspiro[3.5]nonane; 2-methoxy-1-oxaspiro[3.7]undecane; 2,3,3-trimethyl-2-methoxy-1-oxaspiro[3.11]pentadecane; 2-methyl-2-methoxy-1-oxaspiro[3.5]nonane; 2-n-butoxy-1-oxaspiro-[3.4]octane; 2,3-dimethyl-2-ethoxy-oxaspiro[3.5]nonane; 3-phenyl-2-isobutoxy-oxaspiro[3.6]decane; 2-methoxy-1-oxaspiro[3.8]dodecane; etc. It is possible to employ directly the mixed reaction products produced in accordance with said copending application Ser. No. 671,576, inasmuch as 3-alkoxyoxetanes produced in accordance with the aforementioned copending application are not reactive under the conditions of the process of this invention and can be recovered from the reaction products.

In order that those skilled in the art will better be able to practice the invention, the following examples are given by way of illustration and not by way of limitation. All parts are by weight.

EXAMPLE 1

Acetone (125 ml) and vinyl ethyl ether (100 g) were placed in a reaction flask under a blanket of nitrogen and irradiated with an internally water-cooled quartz reactor with a 450 watt medium pressure mercury lamp surrounded by a Vycor 7910 glass filter for 24 hours. Unreacted starting material was recovered by distillation through a short Vigreaux column at atmospheric pressure (b.p. 50°–65 °C) and the residue was distilled in vacuo to yield 51.0 g of a mixture of alkoxyoxetanes, b.p. 60°–80° C/70 mm. Nuclear magnetic resonance analysis indicated this to be a 70:30 mixture of the 3- and 2-ethoxyoxetane. 4,4-Dimethyl-2-ethoxyoxetane, b.p. 54° (62 mm), $n_D^{20}$ 1.4002 was obtained by careful fractionation of enriched fractions. The material analyzed as follows:

Theoretical: C, 64.58; H, 10.84

Found: C, 64.74; H, 10.74

A sample of this material was shaken with three times its volume of distilled water. After a few minutes, there was obtained a homogeneous solution which was continuously extracted with ether for several hours. Evaporation of the ether left 3-methyl-3-hydroxybutyraldehyde as a solid dimer, m.p. 81° C. The aldehyde was identical with a sample obtained independently by hydrolysis of the diethylacetol of 3-methyl-3-hydroxybutylaldehyde.

There is mixed one part of 3-methyl-3-hydroxybutyraldehyde with 20 parts of 0.1 N aqueous HCl. The mixture is heated to 50° C for three hours and extracted with ether. The organic layer is extracted with sodium bicarbonate solution and sodium chloride and dried with magnesium sulfate. The solvent is evaporated under reduced pressure. There is obtained a quantitative yield of 3-methyl-2-buten-1-al which is an intermediate for making vitamin A.

EXAMPLE 2

A mixture (60 grams) containing 20 percent of 4,4-dimethyl-2-ethoxyoxetane and 80 percent of 2,2-dimethyl-3-alkoxyoxetane was shaken with 200 ml of water for 15 minutes. The mixture warmed considerably during this period. The organic phase was taken up with diethyl ether. Vapor phase chromatographic analysis indicated that most of the 2-ethoxy-oxetane had reacted and was present in the aqueous layer. The aqueous layer was evaporated in vacuo to afford, after distillation, 4.0 grams of β-methyl-β-hydroxy-butyraldehyde, b.p. ca 50° C/5 mm Hg, which crystallized upon standing and which was identical with the compound described in Example 1.

EXAMPLE 3

Acetone (200 ml) and n-butyl vinyl ether (100 ml) were irradiated in a quartz reactor through a Vycor filter for 22 hours. After removal of excess solvents, there were obtained 60 g of a 75:25 75.25 mixture of 2,2-dimethy-3-n-butoxy and 4,4-dimethyl-2-n-butoxyoxetane as judged by VPC and NMR analysis. The 3-n-butoxy isomer analyzed as follows:

Found: C, 68.12; H, 11.55
Calculated: C, 68.31; H, 11.47

23.6 g of a mixture containing equal amounts of the two isomeric oxetanes was shaken with 30 ml of water for 20 minutes. The aqueous phase was then continuously extracted with ether to give 4.5 g of the aldehyde described in Example 1.

EXAMPLE 4

Cyclohexanone (125 g) and ethyl vinyl ether (250 ml) were placed in the reactor and irradiated as described in Example 1. There was obtained 61 g of isomeric oxetanes which upon fractionation gave 31.5 g of pure 3-ethoxy-1-oxaspiro[3.5]nonane, b.p. 72° C/4 mm, $n_D^{20}$ = 1.4553.

Found: C, 70.58; H, 10.59
Calculated: C, 70.54; H, 10.66

The isomeric 2-ethoxy-1-exaspiro[3.5]nonane, b.p. 56.50 (2.5 mm), $n_D^{20}$ 1.4502 was obtained by repeated distillation.

Found: C, 70.50; H, 10.52; Mol. wt. 175

Calculated: C, 70.54; H, 10.66; Mol. wt. 170

A sample of the 2-isomer was vigorously shaken with a 1:1 mixture of water and tetrahydrofuran for 20 minutes. The mixture was then poured into sodium chloride solution and extracted with ether to afford (1-hydroxycyclohexyl)acetaldehyde as a colorless liquid, b.p. 68° (0.2 mm) which was characterized by its infrared bands at 3400–3500 cm$^{-1}$ (OH—absorption) and at 2720 and 1715 cm$^{-1}$ (aldehyde-absorption).

A mixture is made using 50 parts of the above 3-hydroxyaldehyde, 100 parts of a polyvinyl chloride having a molecular weight of about 50,000 and 15 parts of basic lead phthalate. The mixture is molded for 10 minutes at 140° C and 100 psi. There is obtained a flexible sheet suitable as a fabric covering useful in manufacturing furniture.

EXAMPLE 5

Freshly distilled benzaldehyde (80 g) and vinyl ethyl ether (350 ml) were charged into a reaction flask under a blanket of nitrogen and irradiated with an internally water-cooled Pyrex reaction with a 450 watt medium pressure mercury lamp for 21 hours. Excess vinyl ethyl ether was distilled off at atmospheric pressure and the residue distilled in vacuo to yield 115 g of a mixture of oxetanes, b.p. 67°–75° C/0.3 mm. Two fractions having a b.p. of 65° C/0.2 mm and 75° C/0.4 mm analyzed as follows:

Fraction 1 -Found: C, 74.03; H, 8.05
Fraction 2 -Found: C, 74.33; H, 8.14
Calculated: C, 74.13; H, 7.92 A sample of the mixtures of oxetanes was dissolved in tetra-hydrofuran and an equal amount of water was added. The mixture was shaken for 20 minutes and the organic material was recovered by extraction with ether. After drying of the etheral solution and evaporation of the ether, there was contained a mixture consisting of isomeric 2-phenyl-3-ethoxyoxetanes and of β-hydroxy-β-phenyl-propionaldehyde which showed characteristic infrared absorption at 3600 cm$^{-1}$ (OH) and 1710 cm$^{-1}$ (saturated aldehyde). Chromatography of this solution with active aluminum oxide gave a mixture of the 3-alkoxyoxetanes from benzene and of cis- and trans-cinnamic-aldehyde from chloroform.

EXAMPLE 6

A mixture of the isomeric oxetanes obtained from the irradiation of cyclohexanone and ethyl vinyl ether described in Example 4 was shaken with equal parts of water and tetrahydrofuran for one hour. The mixture was then poured into water and the organic phase was separated, dried, and chromatographed over deactivated, neutral aluminum oxide. A 1:1-mixture of unchanged 3-ethoxy-1-oxaspiro[3.5]nonane benzene and petroleum ether eluted. Subsequent elution with methanol gave (1-hydroxycyclohexyl)acetaldehyde which was identical with the compound described in Example 4.

Although the above examples are limited to only a few of the very many 3-hydroxy-substituted carbonyl compounds which can be made by the method of the invention, it should be understood that the method of the invention is directed to making a much broader class of such compounds as shown by formulas (1) and (2).

I claim:
1. A process for making 3-hydroxy carbonyl compounds, which comprises
    1. mixing water and a mixture of 2-hydrocarbonoxetane and the corresponding 3-hydrocarbonoxetane in the absence of a proton source to provide a mixture having at least about 2 moles of water per mole of 2-hydrocarbonoxetane, and
    2. recovering the 3-hydroxycarbonyl compound from the resulting mixture, where the 2-hydrocarbonoxetane is selected from the class consisting of,

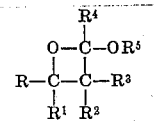

and

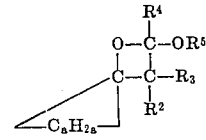

R is a monovalent hydrocarbon radical selected from the class consisting of alkyl radicals containing from 1 to 10 carbon atoms, and aryl radicals containing up to 12 carbon atoms, $R^1$, $R^2$, $R^3$, $R^4$ and $R^5$ are members selected from the class consisting of hydrogen and R radicals and $a$ is an integer equal to 3 to 18 inclusive.

2. A process as in claim 1, wherein the reaction is effected at a temperature of about 25° C.
3. A process in accordance with claim 1, where the oxetane if 4,4-dimethyl-2-ethoxyoxetane.
4. A process in accordance with claim 1, where the oxetane is 2-ethoxy-1-oxaspiro[3.5]nonane.

* * * * *